United States Patent [19]
Ohkubo et al.

[11] Patent Number: 6,156,864
[45] Date of Patent: Dec. 5, 2000

[54] PREPARATION OF FLEXIBLE POLYURETHANE FOAMS

[75] Inventors: Kazuhiko Ohkubo, Kanagawa; Tomoki Tsutsui, Aichi; Yoshitsugu Sakaki, Aichi; Tamotsu Kunihiro, Aichi; Ariko Nishikawa, Aichi; Tsukuru Izukawa, Aichi, all of Japan

[73] Assignee: Mitsui Chemicals, Inc., Tokyo, Japan

[21] Appl. No.: 08/961,532

[22] Filed: Oct. 30, 1997

Related U.S. Application Data

[62] Division of application No. 08/420,596, Apr. 12, 1995, Pat. No. 5,777,175.

[30] Foreign Application Priority Data

| Apr. 12, 1994 | [JP] | Japan | 6-073250 |
| Apr. 12, 1994 | [JP] | Japan | 6-073251 |
| May 20, 1994 | [JP] | Japan | 6-106432 |
| Feb. 14, 1995 | [JP] | Japan | 7-025150 |

[51] Int. Cl.$^7$ .............................. C08G 18/32; C08G 18/48
[52] U.S. Cl. ................................ 528/66; 528/76; 528/85; 521/159; 521/160; 521/174; 521/176
[58] Field of Search .................. 528/76, 66, 85; 521/159, 160, 174, 176

[56] References Cited

U.S. PATENT DOCUMENTS

| 3,393,243 | 7/1968 | Cuscurida . |
| 3,829,505 | 8/1974 | Herold . |
| 3,953,393 | 4/1976 | Ramlow et al. . |
| 4,463,107 | 7/1984 | Simroth et al. . |
| 5,093,380 | 3/1992 | Takeyasu et al. . |
| 5,674,920 | 10/1997 | Obata et al. ............................ 521/159 |

FOREIGN PATENT DOCUMENTS

| 268920 | 6/1988 | European Pat. Off. . |
| 403313 | 12/1990 | European Pat. Off. . |
| 2357592 | 7/1977 | France . |
| 63-75021 | 4/1988 | Japan . |
| 63-146912 | 6/1988 | Japan . |
| 2-115211 | 4/1990 | Japan . |
| 3-14812 | 1/1991 | Japan . |
| 3-68620 | 3/1991 | Japan . |
| 1579640 | 7/1977 | United Kingdom . |

OTHER PUBLICATIONS

Aldrich Catalogue 1996—p. 313.

*Primary Examiner*—Duc Truong
*Attorney, Agent, or Firm*—Burns, Doane, Swecker & Mathis L.L.P.

[57] ABSTRACT

Propylene oxide is added to an active hydrogen compound in the presence of an alkali metal hydroxide catalyst in an amount of from 0.05 to 0.5 mole per mole of the active hydrogen compound at a reaction temperature of from 60 to 98° C. at a reaction pressure less than or equal to 4 kg/cm$^2$ to prepare a polyoxyalkylene polyol which has a hydroxyl value of from 10 to 35 mg KOH/g, a monool content less than or equal to 15 mol %, a Head-to-Tail bond selectivity greater than or equal to 96 percent, and low viscosity. A polymer polyol is prepared by polymerizing an ethylenically unsaturated monomer in the polyoxyalkylene polyol. A flexible polyurethane foam is prepared by reacting the polyoxyalkylene polyol or the polymer polyol with an organic polyisocyanate compound in the presence of a foaming agent, a catalyst, a surfactant, a crosslinking agent and other additives. The thus-obtained polyurethane foams have less closed cells and are more excellent in properties such as hardness, humid aged compression set and impact resiliency.

10 Claims, No Drawings

PREPARATION OF FLEXIBLE POLYURETHANE FOAMS

This application is a divisional, of application Ser. No. 08/420,596, filed Apr. 12, 1995, now U.S. Pat. No. 5,777,175.

BACKGROUND OF THE INVENTION

1. Field of the Invention

The present invention relates to a polyoxyalkylene polyol, a polymer polyol, and a process for preparing a polyoxyalkylene polyol, a polymer polyol or a flexible polyurethane foam. Particularly the invention relates to a polyoxyalkylene polyol having a hydroxyl value of 10 to 35 mg KOH/g, a monool content less than or equal to 15 mol % and a Head-to-Tail bond selectivity greater than or equal to 96 percent resulting from addition polymerization of propylene oxide, a process for preparing the same and a process for reacting an organic polyisocyanate with the above-mentioned polyoxyalkylene polyol in the presence of a catalyst, a surfactant, a foaming agent, a crosslinking agent and other additives to prepare a flexible polyurethane foam improved in humid aged compression set, and further relates to a polymer polyol comprising (a) a polyoxyalkylene polyol having a hydroxyl value of from 10 to 35 mg KOH/g, a monool content less than or equal to 15 mol % and a Head-to-Tail bond selectivity greater than or equal to 96 percent resulting from addition polymerization of propylene oxide, and (b-1) polymer particles which are dispersed in the polyoxyalkylene polyol in the range of from greater than or equal to 5 wt % to less than 30 wt % or (b-2) polymer particles which are dispersed in the polyoxyalkylene polyol in the range of from greater than or equal to 30 wt % to less than or equal to 60 wt % and have a glass transition temperature of from 90 to 120 ° C., and processes for preparing the same and a process for preparing a flexible polyurethane foam comprising reacting an organic polyisocyanate compound with a polyoxyalkylene polyol containing at least one of the above-mentioned polymer polyol in the presence of a foaming agent, a catalyst, a surfactant, a crosslinking agent and other additives.

2. Prior Art

Potassium hydroxide is mainly used as a catalyst in the preparation of polyoxyalkylene polyols for polyurethane raw materials and others. It is well-known that when propylene oxide as an alkylene oxide is added and polymerization is carried out, it causes side-reactions in which monool are formed, and when the molecular weight of polyoxyalkylene polyols is increased, the monool amount is increased. It is thought that when the polyol has a large amount of monools, cross-linking and polymerization are prevented in the urethane reaction of a polyoxyalkylene polyol with an organic polyisocyanate compound, and the thus-obtained flexible polyurethane foam and elastomer are deteriorated in mechanical properties.

In a conventional process such as the addition polymerization of propylene oxide to an active hydrogen compound by using a potassium hydroxide catalyst, the monool content of polymerized polyoxyalkylene polyol having a hydroxyl value less than or equal to 35 mg KOH/g exceeds 15 mol % and it is substantially impossible to prepare a polyoxyalkylene polyol having a hydroxyl value less than or equal to 28 mg KOH/g.

U.S. Pat. No. 3,829,505, JP-A-2-115211 (Tokkaihei) and JP-A-3-14812 (Tokkaihei) disclose processes for using catalysts other than alkali metal catalysts, such as a double metal cyanide complex catalyst in the addition polymerization of propylene oxide as an alkylene oxide to solve the above-mentioned problems. Particularly, JP-A-3-14812 (Tokkaihei) discloses in the comparative examples that double metal cyanide complex catalysts are superior to catalysts containing alkali metal hydroxide. However, there is a problem that these catalysts are extremely expensive and less economical on an industrial scale, and when the addition polymerization of ethylene oxide as an alkylene oxide is carried out, the process needs further removing catalyst and carrying out another polymerization with an alkali metal hydroxide or its alkoxide.

Polyoxyalkylene polyols containing less amounts of monools have a tendency to have a higher viscosity. When a double metal cyanide complex catalyst is used, they have a tendency to have a strikingly high viscosity. It seems to result from their lower Head-to-Tail bond selectivity in the addition polymerization of propylene oxide as an alkylene oxide. When they have a higher viscosity, troubles of molding stability and mixing properties occur in the mechanical molding of flexible polyurethane foams, and high molecular weight polyoxyalkylene polyols are limited for their use.

It is, however, expected that a polymer polyol which has as a matrix a polyoxyalkylene polyol having a large amount of monools as mentioned above also decreases the physical properties of a polyurethane foam and the like.

To solve the above-mentioned problems, U.S. Pat. No. 3,829,505, JP-A-02-115211 (Tokkaihei) and JP-A-03-014812 (Tokkaihei) disclose a process for preparing a polyoxyalkylene polyol in which a catalyst other than an alkali metal catalyst such as a double metal cyanide complex catalyst is used as a catalyst in the addition polymerization of propylene oxide as alkylene oxide and also disclose a polymer polyol wherein the above-mentioned polyoxyalkylene polyol is a matrix. There is a trend that a polyoxyalkylene polyol having a small amount of monools has higher viscosity. Preparation of a polyoxyalkylene polyol by using a double metal cyanide complex catalyst causes a remarkable viscosity increase of polyoxyalkylene polyol. The viscosity increase is due to the low Head-to-Tail bond selectivity in the addition polymerization of propylene oxide as an alkylene oxide. Therefore, it is expected that a polymer polyol resulting from the procedure of radical polymerization of an ethylenically unsaturated monomer in a polyoxyalkylene polyol has also remarkably high viscosity. When a polymer polyol has high viscosity, there are an obstacle to stable molding and mixing in the mechanical molding for manufacturing a flexible polyurethane foam and a limit on the use of a polymer polyol wherein a high molecular weight polyoxyalkylene polyol is a matrix.

Polymer polyols have inferior dispersion stability and higher viscosity. Especially when the polymer content is greater than or equal to 30 wt %, such tendencies are remarkable. It is substantially impossible to prepare a polymer polyol which has high polymer concentration in a polyoxyalkylene polyol as a matrix by using the above-mentioned metal complex catalyst.

It is also known to use a chain transfer agent to solve such problems as the inferior dispersion stability and higher viscosity of highly concentrated polymer polyol. U.S. Pat. No. 3,953,393 and JP-A-01-221403 (Tokkaihei) disclose processes for preparing polymer polyols of low viscosity by using alkylmercaptans as chain transfer agents. According to these processes, however, polymer polyols are bad-smelling and it is difficult to obtain an available polymer polyol because a highly concentrated polymer polyol cannot avoid a sudden viscosity increase.

JP-A-58-210917 (Tokkaisho) discloses a process for using, as a chain transfer agent, mercaptans, ketones, alcohols, aldehydes, halogenated compounds, benzene derivatives, and particularly isopropyl alcohol. The process is, however, insufficient to reduce the viscosity of highly concentrated polymer polyol. JP-A-63-146912 (Tokkaisho) discloses a process for using amines such as morpholines as reaction regulators and the process differs from that of the present invention because of using a special polyol.

Because flexible polyurethane foams have moderate elasticity and are more excellent in impact absorbing property, they are widely used for bedclothes, furniture, sheets of motor vehicles, cushions of furniture and so on. They are usually prepared through the slab or hot mold foaming method. They lack flexibility and have lower elasticity so that they lack the same pleasantness for people compared to rubber latex foam. High elasticity polyurethane foams have been developed to improve conventional flexible polyurethane foams in the above-mentioned properties. They are prepared through the process for reacting polyisocyanate with a polyoxyalkylene polyol and a polymer polyol used for part of the polyoxyalkylene polyol, the polymer polyol is obtained by polymerizing an ethylenically unsaturated monomer such as acrylonitrile, styrene and so on in a polyoxyalkylene polyol, and, after foaming, leaving the foam as it is at temperatures of from room temperature to 100° C. for a short period. While sitting on the foams, people are impressed by their extremely excellent pleasantness so that the foams are widely used for cushions of cars and so on.

They are used for cushions of cars and have to be excellent in stiffness, i.e. hardness and mechanical properties, but are inferior in humid aged durability (hereinafter represented by the term humid aged compression set).

JP-A-63-75021 (Tokkaisho), JP-A-02-115211 (Tokkaihei), JP-A-03-068620 (Tokkaihei) and JP-A-03-014812 (Tokkaihei) disclose processes for improving polyurethane foams in humid aged compression set. JP-A-63-75021 (Tokkaisho) discloses that the use in combination of a special crosslinking agent serves to improve a polyurethane foam in humid aged compression set to some degree but excessive amounts of it deteriorate the foam in mechanical properties such as elongation, tear strength and so on, and there is a limit in the improvement of polyurethane foam in humid aged compression set. JP-A-02-115211 (Tokkaihei), JP-A-03-068620 (Tokkaihei) and JP-A-03-014812 (Tokkaihei) disclose that a polyoxyalkylene polyol having a less total unsaturation degree serves to improve a polyurethane foam in humid aged compression set. These polyoxyalkylene polyols are prepared in the presence of diethylzinc, metallic porphyrin or a double metal cyanide complex catalyst as disclosed in the above-mentioned specifications cited from opened patent official gazettes. According to the results double-checked by the present inventors, however, the flexible polyurethane foam resulting from a polyoxyalkylene polyol prepared by using the above-mentioned double metal cyanide complex catalyst and so on was not improved in humid aged compression set so much as the present inventors had expected.

SUMMARY OF THE INVENTION

Objects of the present invention are to provide a polyoxyalkylene polyol which has a low monool content and a high Head-to-Tail bond selectivity even when polymerization is carried out by adding an alkylene oxide to an active hydrogen compound, a polymer polyol which is low in viscosity and excellent in dispersion stability, processes for preparing the same and a process for preparing a flexible polyurethane foam which has less closed cells and is more excellent in properties such as hardness, humid aged compression set and impact resiliency.

The present inventors earnestly studied to solve the above-mentioned problems and found the fact that determining the amount of alkali metal hydroxide catalyst, reaction temperature and reaction pressure to prepare a special polyoxyalkylene polyol, using the above-mentioned polyoxyalkylene polyol as a matrix of polymer polyol to keep its polymer concentration within a predetermined range and to keep a glass transition temperature of polymer within a predetermined range when the polymer concentration is high, and preparing a flexible polyurethane foam by using the polyoxyalkylene polyol and the polymer polyol were important to achieve the above-mentioned objects.

An aspect of the present invention is a process for preparing a polyoxyalkylene polyol which comprises adding propylene oxide to an active hydrogen compound and carrying out addition polymerization in the presence of an alkali metal hydroxide catalyst in an amount of from 0.05 to 0.5 mole per mole of the active hydrogen compound at 60 to 98° C. at a reaction pressure less than or equal to 4 kg/cm$^2$.

Another aspect of the present invention is a polyoxyalkylene polyol having a hydroxyl value of from 10 to 35 mg KOH/g, a monool content less than or equal to 15 mol % and a Head-to-Tail bond selectivity greater than or equal to 96 percent resulting from addition polymerization of propylene oxide.

Another aspect of the present invention is a process for preparing a flexible polyurethane foam which comprises reacting a polyisocyanate compound with a polyoxyalkylene polyol having a hydroxyl value of from 10 to 35 mg KOH/g, a monool content less than or equal to 15 mol % and a Head-to-Tail bond selectivity greater than or equal to 96 percent resulting from addition polymerization of propylene oxide in the presence of a catalyst, a surfactant, a foaming agent, a crosslinking agent and other additives.

A further aspect of the present invention is a polymer polyol which comprises a polyoxyalkylene polyol having a hydroxyl value of from 10 to 35 mg KOH/g, a monool content less than or equal to 15 mol % and a Head-to-Tail bond selectivity greater than or equal to 96 percent resulting from the addition polymerization of propylene oxide and polymer particles which are dispersed in the polyoxyalkylene polyol in the range of from greater than or equal to 5 wt % to less than 30 wt %.

A still further aspect of the present invention is a polymer polyol which comprises a polyoxyalkylene polyol having a hydroxyl value of from 10 to 35 mg KOH/g, a monool content less than or equal to 15 mol % and a Head-to-Tail bond selectivity greater than or equal to 96 percent resulting from the addition polymerization of propylene oxide and polymer particles which are dispersed in the polyoxyalkylene polyol in the range of from greater than or equal to 30 wt % to less than or equal to 60 wt % and have a glass transition temperature of from 90 to 120° C.

Another aspect of the present invention is a process for preparing a polymer polyol which comprises polymerizing an ethylenically unsaturated monomer in a polyoxyalkylene polyol having a hydroxyl value of from 10 to 35 mg KOH/g, a monool content less than or equal to 15 mol % and a Head-to-Tail bond selectivity greater than or equal to 96 percent resulting from the addition polymerization of propylene oxide.

A further aspect of the present invention is a process for preparing a polymer polyol comprising polymerizing an ethylenically unsaturated monomer in the presence of a chain transfer agent, in a polyoxyalkylene polyol having a hydroxyl value of from 10 to 35 mg KOH/g, a monool content less than or equal to 15 mol % and a Head-to-Tail bond selectivity greater than or equal to 96 percent resulting from the addition polymerization of propylene oxide.

A still further aspect of the present invention is a process for preparing a flexible polyurethane foam comprising reacting an organic polyisocyanate compound with a polyoxyalkylene polyol which contains the above-mentioned polymer polyol in the presence of a foaming agent, a catalyst, a surfactant, a crosslinking agent and other additives.

The thus-obtained polyoxyalkylene polyol has a hydroxyl value of from 10 to 35 mg KOH/g, a monool content less than or equal to 15 mol %, a Head-to-Tail bond selectivity greater than or equal to 96 percent, and low viscosity.

The polymer polyol of the present invention has as a matrix a polyoxyalkylene polyol which has a low monool content and a high Head-to-Tail bond selectivity and properties such as low viscosity, and enhances various fields of polyurethane foams in properties.

Even if polymer polyols are high in concentration, as compared with conventional ones, it is possible to obtain ones which are low in viscosity, free of flocculation of particles and excellent in dispersion stability.

The thus-obtained polyoxyalkylene polyols and polymer polyols give polyurethane foams which have less closed cells, so that crashed foams do not suffer from troubles such as cracks. The polyurethane foams are excellent in properties such as hardness, compression set under humid aging and heat, and impact resiliency.

DESCRIPTION OF THE PREFERRED EMBODIMENT

Polyoxyalkylene Polyols

The active hydrogen compounds include polyhydric alcohols having 2 to 8 hydroxyl groups, preferably 3 to 8 hydroxyl groups, sugars, aliphatic amine compounds, alkanolamines, polyamines, aromatic amine compounds, polyhydric phenols and polyoxyalkylene polyols which have these compounds as initiators and a molecular weight of from 250 to 1000. Preferred are ethylene glycol, diethylene glycol, propylene glycol, dipropylene glycol, 1,4-butylene glycol, glycerin, diglycerin, hexanetriol, trimethylolpropane, pentaerythritol, sorbitol, dextrose, sucrose, methylglycoxide, bisphenol A, bisphenol F, dihydroxydiphenylether, dihydroxybiphenyl, hydroquinone, resorcin, phloroglucine, naphthalenediol, aminophenol, aminonaphthol, phenol-formaldehyde condensates, N-methyl-N,N-diethanolamine, N-ethyl-N,N-diisopropanolamine, monoethanolamine, diethanolamine, triethanolamine, ethylenediamine, propylenediamine, hexamethylenediamine, bis(p-aminocyclohexyl)methane, aniline, toluidines, tolylenediamines, diphenylmethanediamine, naphthalenediamine and so on. They are used alone or in combination.

The alkali metal hydroxide catalysts include potassium hydroxide, sodium hydroxide, lithium hydroxide, rubidium hydroxide and cesium hydroxide, and particularly preferred are catalysts which have a purity greater than or equal to 90 wt % and at least one compound selected from the group consisting of cesium hydroxide and rubidium hydroxide.

The alkylene oxides consist of propylene oxide and at least one alkylene oxide selected from the group consisting of ethylene oxide, 1,2-butylene oxide, 2,3-butylene oxide, styrene oxide and other alkylene oxides having at least 3 carbon atoms. They are used under conditions that the addition polymerization of propylene oxide gives a product which has oxypropylene groups of preferably at least 70 wt %, more preferably at least 80 wt %.

The polyoxyalkylene polyols are obtained by adding an alkylene oxide to the above-mentioned active hydrogen compound to polymerize in the presence of an alkali metal hydroxide catalyst. They have a hydroxyl value of from 10 to 35 mg KOH/g, a monool content less than or equal to 15 mol % and a Head-to-Tail bond selectivity greater than or equal to 96 percent. In case of hydroxyl values less than 10 mg KOH/g, polyoxyalkylene polyols and polymer polyols wherein vinyl polymer particles are dispersed in the polyoxyalkylene polyols as matrices, are extremely high in viscosity and not suitable for materials of flexible polyurethane foams. In their reaction with organic isocyanates to form prepolymers, the products are also extremely high in viscosity and not suitable for use.

In case of polyoxyalkylene polyols which have such low hydroxyl values, polymerization is accompanied by monool content increase. It deteriorates flexible polyurethane foams in compression set at high humidity and temperature and impact resiliency, and deteriorates polyurethane elastomers in mechanical properties, so that the monol content is necessary to be less than or equal to 15 mol %. In case of hydroxyl values more than 35 mg KOH/g, some conventional polyols have a monool content of about 15 mol %, but at even such lower molecular weights, the flexbile polyurethane foams and others do not have characteristics enhanced as mentioned above.

When a polyoxyalkylene polyol which has such a lower monool content resulting from the addition polymerization of propylene oxide has a Head-to-Tail bond selectivity less than 96 percent, the bond selectivity decrease is accompanied by remarkable viscosity increase. It causes problems in molding a flexible polyurethane foam and reacting with an organic isocyanate to form a prepolymer.

The following conditions are necessary in the preparation of the above-mentioned high molecular weight polyoxyalkylene polyols which have their structure controlled. In addition polymerization of propylene oxide to an active hydrogen compound, the amount of alkali metal hydroxide catalyst per mole of the active hydrogen compound is preferably from 0.05 to 0.5 mole, most preferably 0.1 to 0.3 mole. The reaction temperature is preferably from 60 to 98° C., more preferably 70 to 90° C. When the concentration of the catalyst per mole of the active hydrogen compound is more than 0.5 mole, the product's monool content tends to exceed 15 mol % even when the reaction of addition polymerization of propylene oxide proceeds at 60 to 98° C., and its Head-to-Tail bond selectivity is often less than 96 percent, so that the range is unsuitable.

When the concentration of the catalyst per mole of the active hydrogen compound is less than 0.05 mole, the addition polymerization of propylene oxide proceeds slowly, and it is difficult to polymerize to a hydroxyl value of from 10 to 35 mg KOH/g. When an alkali metal hydroxide catalyst is further added to an intermediate polymer obtained by adding propylene oxide to an active hydrogen compound in the presence of the catalyst, the total amount of alkali metal hydroxide catalyst is also in the above-mentioned range.

The reaction pressure is preferably less than or equal to 4 kg/cm² (490 kPa) in the addition polymerization of propylene oxide to an active hydrogen compound in the presence of an alkali metal hydroxide catalyst. In case of reaction pressures more than 4 kg/cm² (490 kPa), the monool content of polyoxyalkylene polyol increases and at lower hydroxyl values, the monool content exceeds 15 mol %, so that the ranges are unsuitable.

When the addition polymerization of alkylene oxide other than propylene oxide such as ethylene oxide and 1,2-butylene oxide alone or in combination with propylene oxide to an active hydrogen compound in the presence of an alkali metal hydroxide catalyst is carried out, the reaction condition may be outside the above-mentioned conditions or inside them.

Methods such as neutralization by using inorganic acids like hydrochloric acid and phosphoric acid, organic acids like acetic acid, carbon dioxide and so on, adsorption by using an adsorbent, wash by using water or a mixture of water and an organic solvent and ion exchange by using an ion-exchange resin, enable to remove the above-mentioned catalyst from crude polyoxyalkylene polyol obtained by adding an alkylene oxide to an active hydrogen compound in the presence of it, and obtain a product.

Polymer Polyols

Polyoxyalkylene polyols are outlined below.

The polyoxyalkylene polyols have a hydroxyl value of from 10 to 35 mg KOH/g and a monool content less than or equal to 15 mol % and a Head-to-Tail bond selectivity greater than or equal to 96 percent resulting from addition polymerization of propylene oxide. They are used alone or in combination.

In case of hydroxyl values less than 10 mg KOH/g, polyoxyalkylene polyols and polymer polyols having the polyoxyalkylene polyols as matrices and dispersed polymer particles of vinyl type are extremely high in viscosity and not suitable for use of flexible polyurethane foams. In case of polyoxyalkylene polyols having such low hydroxyl values, the monool content of the polyols increases according to the addition polymerization, so that flexible polyurethane foams decrease in compression set under high humidity and heat and impact resiliency. It is necessary to keep their monool content less than or equal to 15 mol %. In case of hydroxyl values more than 35 mg KOH/g, some conventional polyols have a monool content of about 15 mol %. Even when they have such a low molecular weight, they do not give a flexible polyurethane foam improved in the above-mentioned properties.

In case of less than 96 percent of Head-to-Tail bond selectivity resulting from addition polymerization of propylene oxide as can be found in polyoxyalkylene polyols having such low monool content, the low Head-to-Tail bond selectivity strikingly increases a polyoxyalkylene polyol in viscosity and a problem occurs in molding a flexible polyurethane foam.

Polymer polyols are outlined below.

The ethylenically unsaturated monomers have at least one ethylenically unsaturated group polymerizable with others. They include acrylonitrile, methacrylonitrile, acrylic acid, phenyl acrylate, methyl methacrylate, methacrylic anhydride, acrylamide, styrene, methylstyrene, phenylstyrene, chlorostyrene, butadiene, 1,4-pentadiene and vinylacetate or mixtures thereof. Acrylonitrile or a mixture of acrylonitrile and styrene is preferable.

The weight ratio of acrylonitrile to styrene is preferably in the range of from 100/0 to 10/90. When the polymer concentration is greater than or equal to 30 wt %, the range of from 90/10 to 30/70 is preferred to reduce the increase of viscosity.

The ethylenically unsaturated monomers are usually used in the range of from 5 to 60 wt % per the sum of the polyol and the monomer to keep the polymer concentration thereof in the range of from 5 to 60 wt %.

When the polymer concentration of polymer polyol is in the range of from greater than or equal to 5 wt % to less than 30 wt %, the polymer polyol is prepared according to known processes. Conditions of this case may be the same as those using a chain transfer agent. When the ethylenically unsaturated monomer is acrylonitrile alone, the glass transition temperature according to general thermal analysis is unclear and cannot be measured. However, when the monomer is a mixture of acrylonitrile and styrene, the temperature is in the range of from 105 to 130° C. When the polymer concentration is greater than or equal to 30 wt % and less than or equal to 60 wt %, a chain transfer agent is used.

The chain transfer agents are usually amine compounds. They are of the general formula (1)

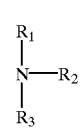

(1)

wherein $R_1$, $R_2$ and $R_3$ are selected from the group consisting of hydrogen atom, an alkyl group having 1 to 10 carbon atoms and a hydroxyalkyl group having 2 to 10 carbon atoms, may be the same or differ from one another, but are not hydrogen atoms all together, or of the general formula (2)

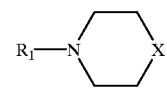

(2)

wherein X is oxygen atom or an $NR_2$ group, $R_1$ is an alkyl group having 1 to 10 carbon atoms, or a hydroxyalkyl group having 2 to 10 carbon atoms, and $R_2$ is hydrogen atom, an alkyl group having 1 to 10 carbon atoms or a hydroxyalkyl group having 2 to 10 carbon atoms. They include amines such as triethylamine, tripropylamine, tributylamine, N,N-diethylethanolamine, N-methylmorpholine and N-ethylmorpholine. Triethylamine and N-methylmorpholine are more preferred.

The amount of chain transfer agent depends upon the glass transition temperature of polymer regulated by using the agent to keep the temperature in the range of from 90 to 120° C., preferably from 95 to 115° C. In case of glass transition temperatures less than 90° C., polyurethane foams are inferior in properties such as hardness, and at glass transition temperatures greater than 120° C., it is impossible to obtain polymers which are low in viscosity and excellent in dispersion stability as desired. The amount of chain transfer agent to realize such a glass transition temperature is one which keeps the molecular weight of polymer in the range of from 30,000 to 140,000 and in the range of from 0.5 to 30 parts by weight, preferably 1 to 20 parts by weight per 100 parts by weight of the ethylenically unsaturated monomer.

The polymerization catalysts are well-known ones for vinyl polymerization reaction. They include peroxides such as hydroperoxide, benzoylperoxide, acetylperoxide, t-butylperoxide and di-t-butylperoxide, azo compounds such as azobisisobutyronitrile, peroxo compounds such as persulfates, persuccinic acid and di-isopropylperoxy-dicarbonate.

The catalysts are used in the range of from 0.01 to 5 wt %, preferably 0.1 to 2.0 wt % per the total weight of polyoxyalkylene polyol and ethylenically unsaturated monomer.

It is possible to carry out the polymerization in the presence of a dispersion stabilizer in order to disperse polymer particles. The dispersion stabilizers include carbon-carbon unsaturated bond containing polyether ester polyols, modified polyols which have at the end thereof an acryl group, a methacryl group and an allyl group as disclosed in JP-B-49-046556 (Tokkosho).

The polymer polyols are prepared by using the above-mentioned polyoxyalkylene polyols, ethylenically unsaturated monomers, chain transfer agents and catalysts.

The polymerization reaction may be carried out in a batchwise or continuous manner. The polymerization temperature is determined depending on the type of catalyst and generally at a level greater than or equal to the decomposition temperature of catalyst, preferably of from 60 to 200° C., and more preferably 90 to 160° C. The polymerization reaction may be carried out in a pressurized system or in a normal pressure system.

After completion of the polymerization reaction, the resulting polymer polyol may be used as it is as a starting material of polyurethane foams. It is more preferable to remove under reduced pressure unreacted monomers, decomposition products of catalyst and chain transfer agent and use the polymer polyol.

Polyurethane Foams

All polyoxyalkylene polyols mentioned above can be used as the polyoxyalkylene polyols.

All polymer polyols mentioned above can be used as the polymer polyols as they are. Polyols containing polymer polyols include the above-mentioned polymer polyols or mixtures of the polymer- polyols with other polyoxyalkylene polyols. Ones having a viscosity less than or equal to 3,000 cps are preferred. Other polyoxyalkylene polyols are not limited particularly but conventional ones in the field may be used. It is also possible to use the same polyoxyalkylene polyol as one for preparing a polymer polyol if necessary.

The organic polyisocyanates include 2,4-tolylene diisocyanate, 2,6-tolylene diisocyanate, mixtures of these isocyanates at weight ratios of 80/20 (80/20-TDI) and of 65/35 (65/35-TDI), crude tolylene diisocyanate(crude TDI), 4,4'-diphenylmethane diisocyanate (4,4'-MDI), 2,4'-diphenylmethane diisocyanate (2,4'-MDI), 2,2'-diphenylmethane diisocyanate (2,2'-MDI), mixtures of diphenylmethane diisocyanate isomers (MDI), polymethylene polyphenyl isocyanate (crude MDI), toluidine diisocyanate, xylylene diisocyanate, hexamethylene diisocyanate, isophorone diisocyanate, dicyclohexylmethane diisocyanate, and carbodiimido-modified products thereof, biuret modified products, dimers, trimers and prepolymers thereof. They may be used alone or in combination.

The foaming agents include water, trichloromonofluoromethane, dichlorodifluoromethane, 2,2-dichloro-1,1,1-trifluoroethane, 1,1-dichloro-1-fluoroethane, methylene chloride, trichlorotrifluoroethane, dibromotetrafluoroethane, trichloroethane, pentane, n-hexane and so on. They are used alone or in combination. Using water alone is preferred from the point of environment protection. The amount is in the range of from 0.01 to 10 parts by weight per 100 parts by weight of polyoxyalkylene polyol.

The catalysts for urethane reaction are well-known ones and not limited in particular. The amine catalysts include triethylamine, tripropylamine, polyisopropanolamine, tributylamine, trioctylamine, hexamethyldimethylamine, N-methylmorpholine, N-ethylmorpholine, N-octadecylmorpholine, monoethanolamine, diethanolamine, triethanolamine, N-methyldiethanolamine, N,N-dimethylethanolamine, diethylenetriamine, N,N,N',N'-tetramethylethylenediamine, N,N,N',N'-tetramethylpropylenediamine, N,N,N',N'-tetramethylbutanediamine, N,N,N',N'-tetramethyl-1,3-butanediamine, N,N,N',N'-tetramethylhexamethylenediamine, bis[2-(N,N-dimethylamino)ethyl]ether, N,N-dimethylbenzylamine, N,N-dimethylcyclohexylamine, N,N,N',N'-pentamethyldiethylenetriamine, triethylenediamine, formate and other salts of triethylenediamine, oxyalkylene adducts of amino groups such as primary and secondary amines, aza cyclic compounds such as N,N-dialkylpiperazines, various N,N',N"-trialkylaminoalkylhexahydrotriazines, β-aminocarbonyl catalysts disclosed in JP-B-52-043517 (Tokkosho) and β-aminonitrile catalysts disclosed in JP-B-53-014278 (Tokkosho). Organometallic catalysts include tin acetate, tin octylate, tin oleate, tin laurate, dibutyl tin diacetate, dibutyl tin dilaurate, dibutyl tin dichloride, lead octanoate, lead naphthenate, nickel naphthenate and cobalt naphthenate. They may be used alone or in combination. The amount is in the range of from 0.0001 to 10.0 parts by weight per 100 parts by weight of compounds having active hydrogen atoms.

The surfactants are well-known organosilicon surface active agents. They include L-520, L-532, L-540, L-544, L-550, L-3550, L-5305, L-3600, L-3601, L-5305, L-5307, L-5309, L-5710, L-5720, L-5740M and L-6202 of Nippon Unicar Co., Ltd., SH-190, SH-194, SH-200, SPX-253, PX-274C, SF-2961, SF-2962, SPX-280X and SPX-294A of Toray Silicone Co., Ltd., F-114, F-121, F-122, F-220, F-230, F-258, F260B, F-317, F-341, F-601, F-606, X-20-200 and X-20-201 of Shinetsu Silicone Co., Ltd., TFA-4200 and TFA-4202 of Toshiba Silicone Co., Ltd., B-4113 of Goldschmidt Co., Ltd, SRX-253, SRX-274C, SF-2961 and SF-2962 of Toray-Dow Cohning Co. The amount thereof is in the range of from 0.1 to 10 parts by weight, preferably from 0.1 to 5 parts by weight, per 100 parts by weight of the total weight of a compound which has active hydrogen atoms and a polyisocyanate.

The crosslinking agents include monomeric polyols such as ethylene glycol, propylene glycol, diethylene glycol, triethylene glycol and 1,3-butanediol, alkanolamines such as triethanolamine and diethanolamine, aliphatic polyamines such as ethylenediamine, diethylenetriamine and triethylenetetramine, aromatic polyamines such as methyleneorthochloroamine, 4,4'-diphenylmethanediamine, aniline, 2,4'-tolylenediamine and 2,6'-tolylenediamine, and compounds obtained by adding, to these active hydrogen compounds, ethylene oxide and propylene oxide to have a hydroxyl value greater than or equal to 200 mg KOH/g. Other compounds having a hydroxyl value greater than or equal to 200 mg KOH/g obtained by adding ethylene oxide and propylene oxide to hydroquinone, resorcin and aniline, may also be used. They are used in the range of 0.1 to 10 parts by weight per 100 parts by weight of polyoxyalkylene polyol.

Stabilizers, fillers, coloring materials and flame retardants may be used in addition to the above-mentioned materials if necessary.

The process for preparing a polyurethane foam is described below. Predetermined amounts of polyoxyalkylene polyol, foaming agent, catalyst, surfactant, crosslinking agent and other additives are mixed in predetermined amounts to obtain a resinous premixture. The amounts of the organic polyisocyanate compound, polyoxyalkylne polyol and cross linking agent are so determined that the ratio by equivalent weight (NCO/H) of the NCO group in the polyisocyanate compound to the active hydrogen atom in the resinous premixture is in the range of from 0.7 to 1.4. The resinous premixture and the polyisocyanate compound are adjusted at a predetermined temperature, for example, of from 20 to 25° C., followed by quick mixing and casting into a mold which has an adjusted temperature, for example, of from 30 to 70° C. The reaction mixture is foamed, filled in the mold and cured in an oven whose predetermined temperature is, for example, in the range of from room temperature to 100° C. for a predetermined time, for example, of from 5 to 30 minutes, and the foam is demolded to obtain a flexible polyurethane foam.

EXAMPLES

The present invention will be explained below in detail by way of examples and comparative examples.

Hydroxyl value: Esterification was carried out by using a pyridine solution of phthalic anhydride and excess phthalic anhydride was checked adding a sodium hydroxide solution according to the method of JIS K 1557.

Monool content:

equipment: high pressure liquid chromatograph (HPLC) of Nihon Bunko Co.

filler of separation column: aminopropyl group chemically bonded type of silica filler eluent: a mixture of hexane and 2-propanol flow rate: 1 ml/min A liquid chromatogram of polyoxyalkylene polyol was drawn to obtain the area ratio of triol to monol based on the peak area intensity detected with a differential refractometer.

Liquid chromatograms of triol and monol which had different molecular weights from each other were drawn under the same conditions as the above-mentioned ones. A calibration curve was drawn up according to the elution peak times based on the chromatograms. Molecular weights of the triol and monol in polyoxyalkylene polyol were calculated according to the curve. Monool contents (mol %) were calculated according to the area ratio and molecular weights related to the trial and monool. The diol constituent in polyoxyalkylene polyol was hardly detected and ignored in the calculation of monool content.

Head-to-Tail bond selectivity or H-T bond selectivity: The $C^{13}$ nuclear magnetic resonance (NMR) spectrum was measured by using dichloroform as a solvent and $C^{13}$ NMR equipment (400 Hz, Nihon Bunko Co.). The Head-to-Tail bond selectivity was determined depending upon the ratio of the signal(16.9–17.4 ppm) of methyl group of oxypropylene segments in Head-to-Tail bonds to the signal(17.7–18.5 ppm) of methyl group of oxypropylene segments in Head-to-Head bonds.

The calculation formula F is outlined below.

A=an integral value of methyl group in Head-to-Head bonds

B=an integral value of methyl group in Head-to-Tail bonds $$F=(0.5A/(0.5A+B))\times 100$$

The origin of each signal was determined referring to data in the report written by F. C. Schilling and A. E. Tonelli (Macromolecules 19, 1337–1343, (1986)).

viscosity: It was determined with a rotation viscometer at 25° C. according to the method of JIS K 1557.

polymer concentration: Methanol was added to a polymer polyol to disperse the resulting mixture well. The resulting mixture was centrifugated to determine the weight of solid particles insoluble in methanol. In case of a polymer polyol consisting of acrylonitrile alone, the polymer concentration was obtained through the process of obtaining the nitrogen content according to the elemental analysis and calculating the polymer concentration.

Tg (glass transition temperature): It was determined by using thermal analysis apparatus DSC-7 of Perkin-Elmer Co. in nitrogen atmosphere at a rising temperature rate of 20 K/min.

Evaluation of Polyoxyalkylene Polyols

1. Preparation of Polyoxyalkylene Polyols

Example 1

Polyoxyalkylene Polyol A: To 1 mole of glycerin was added 0.13 mole of cesium hydroxide, dehydration was carried out at 100° C. for 6 hours and addition polymerization of propylene oxide was carried out at a reaction temperature of 95° C. at a reaction pressure less than or equal to 3.5 kg/cm$^2$ (440 kPa) to obtain a polyoxypropylene polyol having a hydroxyl value of 33 mg KOH/g. To the polyoxypropylene polyol was added 15 wt % of ethylene oxide based on the weight of the polyol at 100° C. to obtain a polyoxyalkylene polyol having a hydroxyl value of 28 mg KOH/g. The viscosity was 1140 cps/25° C. The monool content based on the above-mentioned area ratio of triol to monool was 13.0 mol %. The diol constituent in the polyoxyalkylene polyol was hardly detected and ignored in the calculation of monool content. The H-T bond selectivity was 96.7 mol %. The results are in Table 1.

Example 2

Polyoxyalkylene Polyol B: To 1 mole of glycerin was added 0.43 mole of cesium hydroxide, dehydration was carried out at 100° C. for 6 hours and addition polymerization of propylene oxide was carried out at a reaction temperature of 65° C. at a reaction pressure less than or equal to 2.0 kg/cm$^2$(300 kPa) to obtain a polyoxypropylene polyol having a hydroxyl value of 50 mg KOH/g. To the polyoxypropylene polyol was added propylene oxide at a reaction temperature of 75° C. at a reaction pressure less than or equal to 3 kg/cm$^2$ (400 kPa) to obtain a polyoxypropylene polyol having a hydroxyl value of 28 mg KOH/g. The product's monool content obtained according to example 1 was 11.9 mol %, the viscosity was 1250 cps/25° C. and the H-T bond selectivity was 96.2 mol %. The results are in Table 1.

Example 3

Polyoxyalkylene Polyol C: To 1 mole of glycerin was added 0.23 mole of cesium hydroxide, dehydration was carried out at 100° C. for 6 hours and addition polymerization of propylene oxide was carried out at a reaction temperature of 80° C. at a reaction pressure less than or equal to 3.5 kg/cm$^2$ (440 kPa) to obtain a polyoxypropylene polyol having a hydroxyl value of 28 mg KOH/g. To the polyoxypropylene polyol was added 15 wt % of ethylene oxide based on the weight of the polyol at 100° C. to obtain a polyoxyalkylene polyol having a hydroxyl value of 24 mg KOH/g. The product's monool content obtained according to example 1 was 8.0 mol %, the viscosity was 1650 cps/25° C. and the H-T bond selectivity was 96.3 mol %. The results are in table 1.

Example 4

Polyoxyalkylene Polyol 0: To 1 mole of glycerin was added 0.23 mole of potassium hydroxide, dehydration was carried out at 100° C. for 6 hours and addition polymerization of propylene oxide was carried out at a reaction temperature of 70° C. at a reaction pressure less than or equal to 3.5 kg/cm² (440 kPa) to obtain a polyoxypropylene polyol having a hydroxyl value of 33 mg KOH/g. To the polyoxypropylene polyol was added 15 wt % of ethylene oxide based on the weight of the polyol at 100° C. to obtain a polyoxyalkylene polyol having a hydroxyl value of 29 mg KOH/g. The product's monool content obtained according to example 1 was 13.7 mol %, the viscosity was 1100 cps/25° C. and the H-T bond selectivity was 96.5 mol %. The results are in Table 1.

Example 5

Polyoxyalkylene Polyol E: To 1 mole of adduct of pentaerythritol with propylene oxide having a hydroxyl value of 450 mg KOH/g was added 0.23 mole of cesium hydroxide, dehydration was carried out at 100° C. for 6 hours and addition polymerization of propylene oxide was carried out at a reaction temperature of 80° C. at a reaction pressure less than or equal to 3.5 kg/cm² (440 kPa) to obtain a polyoxypropylene polyol having a hydroxyl value of 50 mg KOH/g. To the polyoxypropylene polyol was added propylene oxide at a reaction temperature of 90° C. at a reaction pressure less than or equal to 3.5 kg/cm² (440 kPa) to obtain a polyoxypropylene polyol having a hydroxyl value of 29 mg KOH/g. To the polyoxypropylene polyol was added 15 wt % of ethylene oxide based on the weight of the polyol at 100° C. to obtain a polyoxyalkylene polyol having a hydroxyl value of 25 mg KOH/g. The product's monool content obtained according to example 1 was 14.3 mol %, the viscosity was 1800 cps/25° C. and the H-T bond selectivity was 96.4 mol %. The results are in Table 1.

Example 6

Polyoxyalkylene Polyol F: To 1 mole of glycerin was added 0.13 mole of cesium hydroxide, dehydration was carried out at 100° C. for 6 hours and addition polymerization of propylene oxide was carried out at a reaction temperature of 60° C. at a reaction pressure less than or equal to 2.0 kg/cm² (300 kPa) to obtain a polyoxypropylene polyol having a hydroxyl value of 50 mg KOH/g. To the polyoxypropylene polyol was added propylene oxide at a reaction temperature of 60° C. at a reaction pressure less than or equal to 2.0 kg/cm² (300 kPa) to obtain a polyoxypropylene polyol having a hydroxyl value of 16 mg KOH/g. The product's monool content obtained according to example 1 was 14.6 mol %, the viscosity was 2300 cps/25° C. and the H-T bond selectivity was 97.0 mol %. The results are in Table 1.

Example 7

Polyoxyalkylene Polyol G: To 1 mole of glycerin was added 0.23 mole of cesium hydroxide and 0.10 mole of rubidium hydroxide, dehydration was carried out at 100° C. for 6 hours and addition polymerization of propylene oxide was carried out at a reaction temperature of 80° C. at a reaction pressure less than or equal to 2.5 kg/cm² (350 kPa) to obtain a polyoxypropylene polyol having a hydroxyl value of 50 mg KOH/g. To the polyoxypropylene polyol was added propylene oxide at a reaction temperature of 80° C. at a reaction pressure less than or equal to 2.5 kg/cm² (350 kPa) to obtain a polyoxypropylene polyol having a hydroxyl value of 33 mg KOH/g. The product's monool content obtained according to example 1 was 10.5 mol %, the viscosity was 950 cps/25° C. and the H-T bond selectivity was 96.3 mol %. The results are in Table 2.

Example 8

Polyoxyalkylene Polyol H: To 1 mole of glycerin was added 0.23 mole of cesium hydroxide, dehydration was carried out at 100° C. for 6 hours and addition polymerization of propylene oxide was carried out at a reaction temperature of 80° C. at a reaction pressure less than or equal to 3.5 kg/cm² (440 kPa) to obtain a polyoxypropylene polyol having a hydroxyl value of 33 mg KOH/g. To the polyoxypropylene polyol was added 15 wt % of ethylene oxide based on the total weight of the polyol at 100° C. to obtain a polyoxyalkylene polyol having a hydroxyl value of 28 mg KOH/g. The monool content of the product obtained according to example 1 was 7.2 mol %, the viscosity was 1290 cps/25° C. and the H-T bond selectivity was 96.4 mol %. The results are in Table 2.

Example 9

Polyoxyalkylene Polyol I: To 1 mole of glycerin was added 0.23 mole of cesium hydroxide, dehydration was carried out at 100° C. for 6 hours and addition polymerization of propylene oxide was carried out at a reaction temperature of 80° C. at a reaction pressure less than or equal to 3.5 kg/cm² (440 kPa) to obtain a polyoxypropylene polyol having a hydroxyl value of 25 mg KOH/g. To the polyoxypropylene polyol was added 15 wt % of ethylene oxide based on the total weight of the polyol at 100° C. to obtain a polyoxyalkylene polyol having a hydroxyl value of 21 mg KOH/g. The product's monool content obtained according to example 1 was 10.5 mol %, the viscosity was 1950 cps/25° C. and the H-T bond selectivity was 97.0 mol %. The results are in Table 2.

Example 10

Polyoxyalkylene Polyol J: To 1 mole of glycerin was added 0.23 mole of cesium hydroxide, dehydration was carried out at 100° C. for 6 hours and addition polymerization of propylene oxide was carried out at a reaction temperature of 80° C. at a reaction pressure less than or equal to 3.5 kg/cm² (440 kPa) to obtain a polyoxypropylene polyol having a hydroxyl value of 20 mg KOH/g. To the polyoxypropylene polyol was added 15 wt % of ethylene oxide based on the total weight of the polyol at 100° C. to obtain a polyoxyalkylene polyol having a hydroxyl value of 17 mg KOH/g. The product's monool content obtained according to example 1 was 14.0 mol %, the viscosity was 2380 cps/25° C. and the H-T bond selectivity was 97.2 mol %. The results are in Table 2.

Example 11

Polyoxyalkylene Polyol K: To 1 mole of pentaerythritol was added 0.23 mole of cesium hydroxide, dehydration was carried out at 100° C. for 6 hours and addition polymerization of propylene oxide was carried out at a reaction temperature of 80° C. at a reaction pressure less than or equal to 3.5 kg/cm² (440 kPa) to obtain a polyoxypropylene polyol having a hydroxyl value of 33 mg KOH/g. To the polyoxypropylene polyol was added 15 wt % of ethylene oxide based on the total weight of the polyol at 100° C. to obtain a polyoxyalkylene polyol having a hydroxyl value of 28 mg KOH/g. The product's monool content obtained according to example 1 was 9.5 mol %, the viscosity was 1420 cps/25° C. and the H-T bond selectivity was 96.5 mol %. The results are in Table 2.

Comparative Example 1

Polyoxyalkylene Polyol L: To 1 mole of glycerin was added 0.37 mole of potassium hydroxide, dehydration was carried out at 100° C. for 6 hours and addition polymerization of propylene oxide was carried out at a reaction temperature of 115° C. at a reaction pressure less than or equal to 5 kg/cm$^2$ (590 kPa) to obtain a polyoxypropylene polyol having a hydroxyl value of 33 mg KOH/g. To the polyoxypropylene polyol was added 15 wt % of ethylene oxide based on the total weight of the polyol at 100° C. to obtain a polyoxyalkylene polyol having a hydroxyl value of 28 mg KOH/g. The product's monool content obtained according to example 1 was 29.3 mol %, the viscosity was 1150 cps/25° C. and the H-T bond selectivity was 96.3 mol %. The results are in Table 3.

Comparative Example 2

Polyoxyalkylene Polyol M: To 1 mole of glycerin was added 6.93 g of so-called double metal cyanide complex catalyst comprising cobalt zinc cyanide, zinc chloride, water and dimethoxyethanol (DMC catalyst), and addition polymerization of propylene oxide was carried out at a reaction temperature of 90° C. at a reaction pressure less than or equal to 4 kg/cm$^2$ (490 kPa) to obtain a polyoxypropylene polyol having a hydroxyl value of 33 mg KOH/g. The reaction mixture was contacted with aqueous ammonia to extract the DMC catalyst and was washed with water. To the reaction mixture was added 0.23 mole of potassium hydroxide per mole of the glycerin in the polyoxypropylene polyol, dehydration was carried out at 100° C. for 6 hours. To the reaction mixture was added 15 wt % of ethylene oxide based on the weight of the polyol to obtain a polyoxyalkylene polyol having a hydroxyl value of 28 mg KOH/g. The product's monool content obtained according to example 1 was 9.6 mol %, the viscosity was 3080 cps/25° C. and the H-T bond selectivity was 85.4 mol %. The results are in Table 3.

Comparative Example 3

Polyoxyalkylene Polyol N: To 1 mole of glycerin was added 0.23 mole of cesium hydroxide, dehydration was carried out at 100° C. for 6 hours and addition polymerization of propylene oxide was carried out at a reaction temperature of 80° C. at a reaction pressure less than or equal to 3.5 kg/cm$^2$ (440 kPa) to obtain a polyoxypropylene polyol having a hydroxyl value of 50 mg KOH/g. To the polyoxypropylene polyol was added propylene oxide at a reaction temperature of 100° C. at a reaction pressure less than or equal to 3.5 kg/cm$^2$ (440 kPa) to obtain a polyoxypropylene polyol having a hydroxyl value of 28 mg KOH/g. The product's monool content obtained according to example 1 was 22.9 mol %, the viscosity was 1200 cps/25° C. and the H-T bond selectivity was 97.5 mol %. The results are in Table 3.

Comparative Example 4

Polyoxyalkylene Polyol O: To 1 mole of glycerin was added 0.53 mole of cesium hydroxide, dehydration was carried out at 100° C. for 6 hours and addition polymerization of propylene oxide was carried out at a reaction temperature of 90° C. at a reaction pressure less than or equal to 3.5 kg/cm$^2$ (440 kPa) to obtain a polyoxypropylene polyol having a hydroxyl value of 117 mg KOH/g. To the polyoxypropylene polyol was added propylene oxide at a reaction temperature of 90° C. at a reaction pressure less than or equal to 3.5 kg/cm$^2$ (440 kPa) to obtain a polyoxypropylene polyol having a hydroxyl value of 31 mg KOH/g. The product's monool content obtained according to example 1 was 22.7 mol %, the viscosity was 1160 cps/25° C. and the H-T bond selectivity was 95.4 mol %. The results are in Table 3.

Comparative Example 5

Polyoxyalkylene Polyol P: To 1 mole of glycerin was added 0.23 mole of cesium hydroxide, dehydration was carried out at 100° C. for 6 hours and addition polymerization of propylene oxide was carried out at a reaction temperature of 95° C. at a reaction pressure less than or equal to 4 kg/cm$^2$ (490kPa) to obtain a polyoxypropylene polyol having a hydroxyl value of 117 mg KOH/g. To the polyoxypropylene polyol was added propylene oxide at a reaction temperature of 95° C. at a reaction pressure less than or equal to 4.5 kg/cm$^2$ (540 kPa) to obtain a polyoxypropylene polyol having a hydroxyl value of 28 mg KOH/g. The product's monool content obtained according to example 1 was 17.7 mol %, the viscosity was 1110 cps/25° C. and the H-T bond selectivity was 96.9 mol %. The results are in Table 3.

All the polyoxyalkylene polyols of the examples and comparative examples were neutralized adding water and phosphoric acid after completion of reaction and dried under reduced pressure to remove formed crystals of alkali metal phosphates by filtration. Their hydroxyl values, viscosity, monool content and H-T bond selectivity were checked according to the above-mentioned methods.

The data of the examples and comparative examples are in tables 1 to 3 en bloc. In Tables, initiator A is glycerin, and initiator B is an adduct (hydroxyl value 450 mg KOH/g) of pentaerythritol with propylene oxide. Catalyst A is cesium hydroxide, catalyst B, potassium hydroxide, catalyst C, rubidium hydroxide and catalyst D, so-called double metal cyanide complex catalyst (DMC catalyst) comprising cobalt zinc cyanide, zinc chloride, water and dimethoxyethanol. PO is propylene oxide and EO is ethylene oxide.

TABLE 1

| Example No. | 1 | 2 | 3 | 4 | 5 | 6 |
|---|---|---|---|---|---|---|
| Polyoxyalkylene polyol | A | B | C | D | E | F |
| Initiator A(mol) | 1 | 1 | 1 | 1 | — | 1 |
| Initiator B(mol) | — | — | — | — | 1 | — |
| Catalyst A(mol) | 0.13 | 0.43 | 0.23 | — | 0.23 | 0.13 |
| Catalyst B(mol) | — | — | — | 0.23 | — | — |

TABLE 1-continued

| Example No. | 1 | 2 | 3 | 4 | 5 | 6 |
|---|---|---|---|---|---|---|
| Catalyst C(mol) | — | — | — | — | — | — |
| Catalyst D(g) | — | — | — | — | — | — |
| PO addition polymerization temperature (°C.) | | | | | | |
| first half | 95 | 65 | 80 | 70 | 80 | 60 |
| latter half | 95 | 75 | 80 | 70 | 90 | 60 |
| Maximum pressure | | | | | | |
| first half (kg/cm$^2$) | 3.5 | 2.0 | 3.5 | 3.5 | 3.5 | 2.0 |
| latter half (kg/cm$^2$) | 3.5 | 3.0 | 3.5 | 3.5 | 3.5 | 2.0 |
| Hydroxyl value after PO addition (mg KOH/g) | 33 | 28 | 28 | 33 | 29 | 16 |
| EO a.p.t.(°C.) | 100 | — | 80 | 100 | 100 | — |
| Maximum pressure(kg/cm$^2$) | 3.5 | — | 3.5 | 3.5 | 3.5 | — |
| Hydroxyl value of product (mg KOH/g) | 28 | 28 | 24 | 29 | 25 | 17 |
| Viscosity(cps/25° C.) | 1140 | 1250 | 1650 | 1100 | 1800 | 2300 |
| Monool content (mol %) | 13.0 | 11.9 | 8.0 | 13.7 | 14.3 | 14.6 |
| H-T selectivity (mol %) | 96.7 | 96.2 | 96.3 | 96.5 | 96.4 | 97.0 |

EO a.p.t.:EO addition polymerization temperature

TABLE 2

| Example No. | 7 | 8 | 9 | 10 | 11 |
|---|---|---|---|---|---|
| Polyoxyalkylene polyol | G | H | I | J | K |
| Initiator A(mol) | 1 | 1 | 1 | 1 | — |
| Initiator B(mol) | — | — | — | — | 1 |
| Catalyst A(mol) | 0.23 | 0.23 | 0.23 | 0.23 | 0.23 |
| Catalyst B(mol) | — | — | — | — | — |
| Catalyst C(mol) | 0.10 | — | — | — | — |
| Catalyst D(g) | — | — | — | — | — |
| PO addition polymerization temperature (°C.) | | | | | |
| first half | 80 | 80 | 80 | 80 | 80 |
| latter half | 80 | 80 | 80 | 80 | 80 |
| Maximum pressure | | | | | |
| first half (kg/cm$^2$) | 2.5 | 3.5 | 3.5 | 3.5 | 3.5 |
| latter half (kg/cm$^2$) | 2.5 | 3.5 | 3.5 | 3.5 | 3.5 |
| Hydroxyl value after PO addition (mg KOH/g) | 33 | 33 | 25 | 20 | 33 |
| EO a.p.t.(°C.) | — | 100 | 100 | 100 | 100 |
| Maximum pressure(kg/cm$^2$) | — | 3.5 | 3.5 | 3.5 | 3.5 |
| Hydroxyl value of product (mg KOH/g) | 34 | 28 | 21 | 17 | 28 |
| Viscosity(cps/25° C.) | 950 | 1290 | 1950 | 2380 | 1420 |
| Monool content (mol %) | 10.5 | 7.2 | 10.5 | 14.0 | 9.5 |
| H-T selectivity (mol %) | 96.3 | 96.4 | 97.0 | 97.2 | 96.5 |

EO a.p.t.: EO addition polymerization temperature

TABLE 3

| Comparative Example No. | 1 | 2 | 3 | 4 | 5 |
|---|---|---|---|---|---|
| Polyoxyalkylene polyol | L | M | N | O | P |
| Initiator A(mol) | 1 | 1 | 1 | 1 | 1 |
| Initiator B(mol) | — | — | — | — | — |
| Catalyst A(mol) | — | — | 0.23 | 0.53 | 0.23 |
| Catalyst B(mol) | 0.37 | — | — | — | — |
| Catalyst C(mol) | — | — | — | — | — |
| Catalyst D(g) | — | 6.93 | — | — | — |
| PO addition polymerization temperature (°C.) | | | | | |
| first half | 115 | 90 | 80 | 90 | 95 |
| latter half | 115 | 90 | 100 | 90 | 95 |
| Maximum pressure (kg/cm$^2$) | | | | | |
| first half | 5.0 | 4.0 | 3.5 | 3.5 | 4.0 |
| latter half | 5.0 | 4.0 | 3.5 | 3.5 | 4.5 |
| Hydroxyl value after PO addition | 33 | 33 | 28 | 31 | 28 |
| (mg KOH/g) | | | | | |
| EO a.p.t.(°C.) | 100 | 100 | — | — | — |
| Maximum pressure(kg/cm$^2$) | 5.0 | 4.0 | — | — | — |
| Hydroxyl value of product | 28 | 28 | 28 | 31 | 28 |
| (mg KOH/g) | | | | | |
| Viscosity(cps/25° C.) | 1150 | 3080 | 1200 | 1160 | 1110 |
| Monool contents(mol %) | 29.3 | 9.6 | 22.9 | 22.7 | 17.7 |
| H-T selectivity (mol %) | 96.3 | 85.4 | 97.5 | 95.4 | 96.9 |

EO a.p.t.: EO addition polymerization temperature

2. Preparation of Polymer Polyols

Manufacturing Example 1

Polymer Polyol C: A one-liter autoclave equipped with a thermometer, an agitator and a liquid feeder was charged and filled up with polyoxyalkylene polyol C obtained in example 3 and the contents were heated to 120° C. under stirring. A mixture of the polyol, AIBN and AN which had been preliminarily mixed at a ratio in Table 4, was continuously charged to continuously obtain a polymer polyol from the discharge port. The reaction pressure was 3.5 kg/cm$^2$ (440 kPa) and the residence time was 50 minutes. After the condition became constant, the thus-obtained reaction mixture was subjected to suction treatment at 120° C. at 20 mm Hg for 4 hours under reduced pressure, thereby removing unreacted monomers and obtaining polymer polyol C. The results are in Table 4.

Manufacturing Example 2

Polymer Polyol L: A one-liter autoclave equipped with a thermometer, an agitator and a liquid feeder was charged with and filled up with polyoxyalkylene polyol L obtained in comparative example 1 and the contents were heated to 120° C. under stirring. A mixture of the polyol, AIBN and AN which had been preliminarily mixed at a ratio in Table 4, was continuously charged to continuously obtain a polymer polyol from the discharge port. The reaction pressure was 3.5 kg/cm$^2$ (440 kPa) and the residence time was 50 minutes. After the condition became constant, the thus-obtained reaction mixture was subjected to suction treatment at 120° C. at 20 mm Hg for 4 hours under reduced pressure, thereby removing unreacted monomers and obtaining polymer polyol L. The results are in Table 4.

Manufacturing Example 3

Polymer Polyol M: A one-liter autoclave equipped with a thermometer, an agitator and a liquid feeder was charged with and filled up with polyoxyalkylene polyol M obtained in comparative example 2 and the contents were heated to 120° C. under stirring. A mixture of the polyol, AIBN and AN which had been preliminarily mixed at a ratio in Table 4, was continuously charged to continuously obtain a polymer polyol from the discharge port. The reaction pressure was 3.5 kg/cm$^2$ (440 kPa) and the residence time was 50 minutes. After the condition became constant, the thus-obtained reaction mixture was subjected to suction treatment at 120° C. at 20 mm Hg for 4 hours under reduced pressure, thereby removing unreacted monomers and obtaining polymer polyol M. The results are in Table 4.

The polymer polyols of manufacturing examples 1 to 3 were checked according to the above-mentioned methods to obtain hydroxyl values and viscosity. The polymer concentration was obtained through the measurement of nitrogen content according to the elementary analysis and calculating the polymer concentration. AIBN and AN are simple substitutes of azobisisobutyronitrile and acrylonitrile, respectively.

TABLE 4

| Manufacturing Example No. | 1 | 2 | 3 |
|---|---|---|---|
| Polymer polyol | C | L | M |
| Polyoxyalkylene polyol C | 77.6 | — | — |
| Polyoxyalkylene polyol L | — | 77.6 | — |
| Polyoxyalkylene polyol M | — | — | 77.6 |
| AIBN | 0.35 | 0.35 | 0.35 |
| AN | 22.4 | 22.4 | 22.4 |
| Hydroxyl value(mg KOH/g) | 19.5 | 22.8 | 22.8 |
| Viscosity(cps/25° C.) | 4800 | 3600 | 9540 |
| Polymer concentration (wt %) | 21.0 | 20.6 | 20.9 |

The units of raw materials and catalyst are parts by weight.

3. Preparation of Polyurethane Foams

Used were the following materials and so on other than the above-mentioned polyoxyalkylene polyols and polymer polyols.

- Catalyst-1: Minico L-1020 (trade name), an amine catalyst by Katsuzai Chemical Co., 33% diethyleneglycol solution of triethylenediamine
- Catalyst-2: Niax A-1 (trade name), an amine catalyst by ARCO Co.
- Crosslinking agent-1: KL-210 (trade name), an amine crosslinking agent having a hydroxyl value of 830 mg KOH/g by Mitsui Toatsu Chemicals Inc.
- Surfactant: SRX-274C (trade name), a surfactant by Toray-Dow Cohning Co.
- Isocyanate-1: Cosmonate TM-20 (trade name), a mixture of TDI-80 and Polymeric MDI (weight ratio of 80:20) by Mitsui Toatsu Chemicals Inc.

Properties were measured according to the rules JIS K-6301 and JIS K-6401. Densities in examples and comparative examples mean overall ones.

Example 12

The seven constituents described below were, mixed to form a resinous premixture.

| | |
|---|---|
| polyoxyalkylene polyol C | 60 parts by weight |
| polymer polyol C | 40 parts by weight |
| water | 3.0 parts by weight |
| catalyst-1 | 0.5 part by weight |
| catalyst-2 | 0.1 part by weight |
| crosslinking agent-1 | 3.0 parts by weight |
| surfactant | 1.0 part by weight |

Mixing of 107.6 parts by weight of the above-mentioned resinous premixture with 39 parts by weight of isocyanate-1 was carried out. The mixture was put into a metallic mold (400 mm×400 mm×100 mm) adjusted at 60° C. in advance. The mold was covered up to carry out foaming. The mold was heated in a hot air oven at 100° C. for 7 minutes to cure the foam and the foam was taken out of the mold. The properties of the thus-obtained foam are in Table 5. The equivalent weight ratio (NCO/H) of the NCO group of isocyanate to the active hydrogen atom of resinous premixture was 1.00.

Examples 13 to 17

The same procedure as in example 12 was carried out, except that polyoxyalkylene polyols E, H, I, J and K were used in place of polyoxyalkylene polyol C of example 12.

The equivalent weight ratio (NCO/H) of the NCO group of isocyanate to the active hydrogen atom of resinous premixture was 1.00. The properties of the thus-obtained foam are in Table 5.

Comparative Example 6

The same procedure as in example 12 was carried out, except that polyoxyalkylene polyol L was used in place of polyoxyalkylene polyol C and polymer polyol L was used in place of polymer polyol C of example 12.

The equivalent weight ratio (NCO/H) of the NCO group of isocyanate to the active hydrogen atom of resinous premixture was 1.00. The properties of the thus-obtained foam are in Table 5.

Comparative Example 7

The same procedure as in example 12 was carried out, except that polyoxyalkylene polyol M was used in place of polyoxyalkylene polyol C and polymer polyol M was used in place of polymer polyol C of example 12.

The equivalent weight ratio (NCO/H) of the NCO group of isocyanate to the active hydrogen atom of resinous premixture was 1.00. The properties of the thus-obtained foam are in Table 5.

The foam of comparative example 7 (double metal cyanide complex catalyst) was extremely larger in number of closed cells and extremely larger in cell size than the foams of examples.

TABLE 5

| Example No. | 12 | 13 | 14 | 15 | 16 | 17 | CO.6 | CO.7 |
|---|---|---|---|---|---|---|---|---|
| Polyoxyalkylene polyol | C | E | H | I | J | K | L | M |
| Polymer polyol | C | C | C | C | C | C | L | M |
| Density(kg/m$^3$) | 54.0 | 54.4 | 54.1 | 54.3 | 54.2 | 54.3 | 54.4 | 54.9 |
| Hardness 25% | 18.0 | 18.5 | 19.1 | 17.5 | 16.4 | 19.2 | 18.6 | 18.2 |

TABLE 5-continued

| Example No. | 12 | 13 | 14 | 15 | 16 | 17 | CO.6 | CO.7 |
|---|---|---|---|---|---|---|---|---|
| ILD (kg/314cm$^2$) | | | | | | | | |
| 50% Humid aged compression set (%) | 7.5 | 7.7 | 8.0 | 7.4 | 7.4 | 7.9 | 14.1 | 18.0 |

CO. 6 and CO.7 mean comparative examples 6 and 7, respectively.

The foams of examples 12 to 14 and 17 had a density in the range of from 54 to 55 kg/m$^3$, and a 50% humid aged compression set value in the range of from 7 to 8% when they had a 25% ILD value in the range of from 18 to 20 kg/314cm$^2$. However, the foams of comparative examples 6 to 7 had almost the same density and hardness, and had a 50% humid aged compression set value in the range of from 14 to 18%. These data showed that the flexible polyurethane foams of the present examples are improved in humid aged compression set.

Evaluation of Polymer Polyols

1. Preparation of Polyoxyalkylene Polyols

Raw materials, abbreviations and analysis methods in the examples and comparative examples are explained below.

polyols A to E: polyoxyalkylene polyols in manufacturing examples 1 to 5 catalyst a: cesium hydroxide catalyst b: potassium hydroxide catalyst c: a catalyst comprising zinc-cobalt cyanide compound, zinc chloride, water and dimethoxyethanol, so-called double metal cyanide complex catalyst PO: propylene oxide EO: ethylene oxide AN: acrylonitrile St: styrene TEA: triethylamine AIBN: azobisisobutyronitrile polymer polyols a to i: polymer polyols in examples 18 to 22 and comparative examples 8 to 11 water: ion-exchanged water

L-1020: a catalyst produced by Katsuzai Chemicals Co.

X-DM: a catalyst produced by Katsuzai Chemicals Co.

KL-210: a crosslinking agent produced by Mitsui Toatsu Chemicals Inc.

L-5309: a surfactant produced by Nippon Unicar Co.

TM-20: a mixture consisting of TDI-80/20 (a mixture consisting of 2,4-tolylene diisocyanate and 2,6-tolylene diisocyanate at a weight ratio of 80 to 20) and Cosmonate MDI-CR produced by Mitsui Toatsu Chemicals Inc. at a weight ratio of 80 to 20 properties of foams: They were determined according to the methods of JIS K-6301 and JIS K-6401.

1. Preparation of Polyoxyalkylene Polyols

Manufacturing Examples 1 to 4

To glycerin was added catalyst a or b, and dehydration was carried out at 100° C. for 6 hours. Propylene oxide was added to carry out addition polymerization under the conditions in Table 6 and 15 wt % of ethylene oxide based on the total weight of the resulting polyoxyalkylene polyol was added to carry out addition polymerization. After completion of the reactions, water and phosphoric acid were added to neutralize and dry under reduced pressure. The formed crystals of alkali metal phosphates were removed by filtration to obtain polyols A to D. The properties are in Table 6.

Manufacturing Example 5

To glycerin was added 6.93 g of catalyst c, and propylene oxide was added to carry out addition polymerization under the conditions in Table 6. The catalyst c was extracted with ammonia water. The resulting polyoxyalkylene polyol was purified washing with water. To the polyol was added 0.23 mole of potassium hydroxide per mole of glycerin, and dehydration was carried out at 100° C. for 6 hours. Ethylene oxide was added to carry out addition polymerization under the conditions in Table 6. The formed crystals of alkali metal phosphate were removed by filtration to obtain polyol E. The properties are in Table 6.

TABLE 6

| Manufacturing Example No. | 1 | 2 | 3 | 4 | 5 |
|---|---|---|---|---|---|
| Polyol | A | B | C | D | E |
| Glycerin (mol) | 1.00 | 1.00 | 1.00 | 1.00 | 1.00 |
| Catalyst a(mol) | 0.23 | 0.23 | — | — | — |
| Catalyst b(mol) | — | — | 0.37 | 0.37 | 0.23 |
| Catalyst c(g) | — | — | — | — | 6.93 |
| PO addition | | | | | |
| Reaction temperature(°C.) | 80 | 80 | 115 | 115 | 90 |
| Maximum pressure(kg/cm$^2$) | 3.5 | 3.5 | 4.0 | 4.0 | 4.0 |
| Hydroxyl value(mg KOH/g) | 37 | 28 | 37 | 28 | 28 |
| EO addition | | | | | |
| Reaction temperature(°C.) | 80 | 80 | 115 | 115 | 90 |
| Maximum pressure(kg/cm$^2$) | 3.5 | 3.5 | 4.0 | 4.0 | 4.0 |
| Hydroxyl value(mg KOH/g) | 33.8 | 23.5 | 33.4 | 24.0 | 24.0 |
| Monool content (mol %) | 6.7 | 8.0 | 24.0 | 35.5 | 11.0 |
| Head-to-Tail selectivity (mol %) | 96.8 | 96.4 | 96.3 | 96.4 | 86.4 |
| Viscosity(cps/25° C.) | 1100 | 1650 | 900 | 1400 | 3300 |

2. Preparation of Polymer Polyols

Examples 18 to 22 and Comparative Examples 8 to 11

Each polyol sample was charged into a one-liter autoclave equipped with a thermometer, an agitator and a liquid feeder and the contents were heated to 120° C. under stirring. A mixture of the polyol, AIBN, AN, St, TEA which had been preliminarily mixed at a ratio in Tables 7 and 8, was continuously charged. The resulting polymer polyol was continuously obtained from the discharge port. The reaction pressure was 3.5 kg/cm$^2$ (440 kPa) and the residence time was 50 minutes. After the condition became constant, the thus-obtained reaction mixtures were subjected to suction treatment at 120° C. at 20 mm Hg for 4 hours under reduced pressure, thereby removing unreacted monomers and TEA and obtaining polymer polyols a to i. The results are in Tables 7 and 8.

TABLE 7

| Example No. | 18 | 19 | 20 | 21 | 22 |
|---|---|---|---|---|---|
| Polymer polyol | a | b | e | f | g |
| Polyol A | — | 47.55 | 53.33 | 53.33 | — |
| Polyol B | 77.60 | — | — | — | 46.86 |
| AN | 22.40 | 41.96 | 37.34 | 30.34 | 42.51 |
| St | — | 10.49 | 9.33 | 16.33 | 10.63 |
| TEA | — | 4.00 | 1.00 | 1.00 | 4.00 |
| AIBN | 0.35 | 0.26 | 0.26 | 0.26 | 0.26 |

TABLE 7-continued

| Example No. | 18 | 19 | 20 | 21 | 22 |
|---|---|---|---|---|---|
| Hydroxyl Value (mg KOH/g) | 19.5 | 19.7 | 18.6 | 18.6 | 15.3 |
| Viscosity (cps/25° C.) | 4800 | 6600 | 6840 | 6500 | 13200 |
| Polymer concentration (wt %) | 21.0 | 47.6 | 44.8 | 44.0 | 50.0 |
| Tg (°C.) | — | 99 | 115 | 118 | 99 |
| Flocculated particles | no | no | no | no | no |

Notes:
no means flocculated particles were not found. The units of raw materials, catalyst and additives are parts by weight.

TABLE 8

| | Comparative Example No. | | | |
|---|---|---|---|---|
| | 8 | 9 | 10 | 11 |
| Polymer polyol | b | c | h | i |
| Polyol A | — | — | — | 53.33 |
| Polyol C | — | — | 53.33 | — |
| Polyol D | 77.60 | — | — | — |
| Polyol E | — | 75.97 | — | — |
| AN | 22.40 | 18.97 | 37.34 | 37.34 |
| St | — | 5.07 | 9.33 | 9.33 |
| TEA | — | — | — | — |
| AIBN | 0.35 | 0.35 | 0.26 | 0.26 |
| Hydroxyl Value (mg KOH/g) | 19.8 | 18.1 | 18.5 | 18.9 |
| Viscosity (cps/25° C.) | 4100 | 12000 | 14500 | 15000 |
| Polymer concentration (wt %) | 20.8 | 22.3 | 44.2 | 44.0 |
| Tg (°C.) | — | 112 | 123 | 125 |
| Flocculated particles | no | found | found | found |

Notes:
no means particles were not found and found means particles were found. The units of raw materials, catalyst and additives are parts by weight.

3. Preparation of Polyurethane Foams

Examples 23 to 24 and Comparative Examples 12 to 13

Polymer polyols, polyols, water, L-1020, X-DM, KL-210 and L-5309 were mixed at ratios in Table 9 to form resinous premixtures and adjust them at 25 ° C. TM-20 whose ratio by equivalent weight of NCO group to active hydrogen atoms in the resinous premixture was 1.00, was adjusted at 25° C. The ratio of TM-20 to the resinous premixture preliminarily mixed was adjusted to obtain a foam having an intended density. The mixture was quickly mixed under stirring for 6 seconds, followed by casting it into an aluminum test mold preliminarily heated at 60° C. and coated with a mold release agent on the market. The mold was covered up and shut tight with clamps to cure the contents. Three minutes after starting of mixing, the clamps were removed and a cured flexible polyurethane foam was demolded to determine the degree of closed cells content according to the strength appearing in holding down the foam by hand. After that, the foam was compressed and crushed with a roller at a compression ratio in thickness of 20 percent based on the initial thickness thereof. These procedures were repeated to obtain other samples. Twenty-four hours later, properties were determined. Properties thereof are in Table 9.

TABLE 9

| | ex.23 | co.12 | ex.24 | co.13 |
|---|---|---|---|---|
| Polymer polyol a | 40 | — | — | — |
| Polymer polyol b | — | 40 | — | — |
| Polymer polyol e | — | — | 28 | — |
| Polymer polyol h | — | — | — | 28 |
| Polyol C | 60 | 60 | 72 | 72 |
| H$_2$O | 3.3 | 3.3 | 3.5 | 3.5 |
| L-1020 | 0.4 | 0.4 | 0.4 | 0.4 |
| X-DM | 0.3 | 0.3 | 0.3 | 0.3 |
| L-5309 | 1.0 | 1.0 | 1.0 | 1.0 |
| KL-210 | 3.0 | 3.0 | 3.0 | 3.0 |
| Degree of closed cells content | small | small | small | large |
| Cracks in foam crushed | no | no | no | found |
| Overall density (kg/m$^3$) | 50 | 50 | 50 | 50 |
| Hardness 25% ILD(kg/314 cm$^2$) | 22 | 21 | 24 | 22 |
| Tensile strength (kg/cm$^2$) | 1.52 | 1.37 | 1.15 | 1.04 |
| Elongation (%) | 120 | 105 | 114 | 112 |
| Tear strength (kg/cm$^2$) | 0.60 | 0.53 | 0.64 | 0.58 |
| 50% Humid aged compression set (%) | 9.3 | 11.3 | 16.2 | 20.6 |
| Impact resiliency (%) | 74 | 71 | 76 | 73 |

Notes:
no means cracks were not found and found means cracks were found. The units of raw materials, catalyst and additives are parts by weight.

What is claimed is:

1. A process for preparing a flexible polyurethane foam which comprises reacting a polyisocyanate compound with a polyoxyalkylene polyol having a hydroxyl value of from 10 to 35 mg KOH/g, a monool content less than or equal to 15 mol % and a Head-to-Tail bond selectivity of at least 96 percent resulting from addition polymerization of propylene oxide in the presence of a catalyst, a surfactant, a foaming agent, a crosslinking agent and other additives.

2. A process according to claim 1, wherein a part of the polyoxyalkylene polyol is substituted with a polymer polyol resulting from polymerizing an ethylenically unsaturated monomer in a polyoxyalkylene polyol as a matrix.

3. A process according to claim 1, wherein the foaming agent is water.

4. A process for preparing a flexible polyurethane foam which comprises adding propylene oxide to an active hydrogen compound and carrying out addition polymerization in the presence of an alkali metal hydroxide catalyst in an amount of from 0.05 to 0.5 mole per mole of the active hydrogen compound at 60 to 98° C. at a reaction pressure less than or equal to 4 kg/cm$^2$ to obtain a polyoxyalkylene polyol, and reacting the polyoxyalkylene polyol with a polyisocyanate compound in the presence of a catalyst, a surfactant, a foaming agent, a crosslinking agent and other additives.

5. A process according to claim 4, wherein the active hydrogen compound contains from 2 to 8 hydroxyl groups.

6. A process according to claim 4, wherein the alkali metal hydroxide catalyst has a purity of at least 90 wt % and contains at least one compound selected from the group consisting of cesium hydroxide and rubidium hydroxide.

7. A process according to claim 4, wherein the alkali metal hydroxide catalyst is cesium hydroxide or rubidium hydroxide.

8. A process according to claim 4, wherein the polyoxyalkylene polyol contains an oxypropylene group content of at least 70 wt %.

9. A process for preparing a flexible polyurethane foam which comprises reacting an organic polyisocyanate compound with a polymer polyol which contains a polymer polyol comprising a polyoxyalkylene polyol having a hydroxyl value of from 10 to 35 mg KOH/g, a monool content less than or equal to 15 mol % and a Head-to-Tail bond selectivity greater than or equal to 96 percent resulting from addition polymerization of propylene oxide and polymer particles which are dispersed in the polyoxyalkylene polyol in the range of from greater than or equal to 5 wt % to less than 30 wt %, in the presence of a foaming agent, a catalyst, a surfactant, a crosslinking agent and other additives.

10. A process for preparing a flexible polyurethane foam which comprises reacting an organic polyisocyanate compound with a polymer polyol which contains a polymer polyol comprising a polyoxyalkylene polyol having a hydroxyl value of from 10 to 35 mg KOH/g, a monool content less than or equal to 15 mol % and a Head-to-Tail bond selectivity greater than or equal to 96 percent resulting from addition polymerization of propylene oxide and polymer particles which are dispersed in the polyoxyalkylene polyol in the range of from greater than or equal to 30 wt % to less than or equal to 60 wt % and have a glass transition temperature of from 90 to 120° C., in the presence of a foaming agent, a catalyst, a surfactant, a crosslinking agent and other additives.

\* \* \* \* \*